United States Patent [19]

Leger et al.

[11] Patent Number: 4,952,330
[45] Date of Patent: Aug. 28, 1990

[54] NONAQUEOUS ELECTROLYTE

[75] Inventors: Violeta Z. Leger, North Olmsted; Jack W. Marple, Elyria, both of Ohio

[73] Assignee: Eveready Battery Company, Inc., St. Louis, Mo.

[21] Appl. No.: 356,490

[22] Filed: May 25, 1989

[51] Int. Cl.$^5$ ............................................. H01M 6/14
[52] U.S. Cl. ..................................... 252/62.2; 429/197
[58] Field of Search ........................ 429/197; 252/62.2

[56] References Cited

U.S. PATENT DOCUMENTS

| | | | |
|---|---|---|---|
| 4,071,665 | 1/1978 | Garth | 429/197 |
| 4,129,691 | 12/1978 | Broussely | 429/197 |
| 4,264,690 | 4/1981 | Rao | 429/197 X |
| 4,804,595 | 2/1989 | Bakos et al. | 429/197 X |

FOREIGN PATENT DOCUMENTS

| | | | |
|---|---|---|---|
| 55-53072 | 4/1980 | Japan | 429/197 |
| 57-50772 | 3/1982 | Japan . | |
| 58-152374 | 4/1983 | Japan . | |
| 58-163176 | 9/1983 | Japan . | |
| 59-73849 | 4/1984 | Japan . | |
| 63-152886 | 6/1988 | Japan . | |

*Primary Examiner*—Stephen J. Kalafut
*Attorney, Agent, or Firm*—Virgil B. Hill

[57] ABSTRACT

The invention relates to a nonaqueous electrolyte for cells such as Li/FeS$_2$ cells, comprising a solute, such as LiCF$_3$SO$_3$, dissolved in a mixture of a major amount of dioxolane (i.e. 40–53 volume percent), a minor amount of propylene carbonate (i.e. 8–18 volume percent) and dimethoxyethane (i.e. 32–40 volume percent).

17 Claims, No Drawings

NONAQUEOUS ELECTROLYTE

FIELD OF THE INVENTION

The invention relates to a galvanic cell employing an organic electrolyte containing 40 to 53 volume percent of a polymerizable component of a cyclic ether [e.g. dioxolane (DIOX)], 8 to 18 volume percent of an alkylene carbonate [e.g. propylene carbonate (PC)] and 32 to 45 volume percent of a linear aliphatic ether [e.g. 1,2-diemthoxyethane (DME)].

BACKGROUND OF THE INVENTION

The battery has become a primary power source for many portable electronic devices such as radios, compact disc players, televisions, cameras, calculators, and the like. The development of these battery systems requires the compatibility of an electrolyte possessing desirable electrochemical properties with highly active anode materials, such as lithium, sodium, calcium and the like, and the efficient use of high energy density cathode materials such as iron sulfide-containing cathodes, metal oxide cathodes and the like. Under abuse conditions, such as forced charging, forced discharging or external shorting, these cell systems could be subject to leakage or in some instances even cell disassembly. To protect some cells against abuse conditions, the cells are generally equipped with a vent mechanism to permit the electrolyte to escape when the internal pressure exceeds a predetermined limit. Although a vent mechanism may protect the cell against disassembly, the electrolyte that escapes may cause damage to the device being powered or any subject that it may contact. Consequently, in some cell systems, it is desirable to have safety means other than venting mechanisms that would disconnect the electrical circuit of the cell when subjected to abuse conditions and thereby prevent electrolyte leakage or cell disassembly.

In copending U.S. patent application Ser. No. 217,502 filed on Jul. 11, 1988 an electrochemical cell is disclosed that employs a current collector-safety switch member composed of an electrically conductive shape memory metal alloy in the electric circuit of the cell, a portion of which member retracts and breaks or disconnects the electrical circuit of the cell when the internal temperature of the cell exceeds a predetermined level. This results in terminating the temperature rise in the cell due to forced charging, forced discharging or external shorting.

In addition to employing safety means such as an internal circuit interrupter as disclosed above, the cell components must be selected so that once the circuit is disconnected, it remains disconnected. For example, when employing a conductive memory metal alloy as described above, the memory alloy, once activated to open the internal cell circuit, should remain fixed so that it does not close the internal cell circuit and thereby subject the cell to the same abuse condition that activated the memory metal alloy. However, in lithium cells, such as Li/FeS$_2$ cells, intermittently opening and closing of the cell's internal circuit can be caused by lithium plating and the formation of lithium dendrites, particularly in the vicinity of the circuit interrupter means. Thus under adverse conditions, the circuit interrupter means can effectively be electrically bypassed by this intermittent reconnection of the internal cell circuit, often referred to as chattering. The dendrite formation could also produce contact to another conductive member electronically connected to the cathode which may result in internal cell shorting. This internal shorting could result in cell disassembly in some instances.

Many electrolytes have been recited in the art as suitable for use in cells, such as lithium cells. For example, U.S. Pat. No. 4,129,691 discloses an electrolyte for use in lithium primary cells which is made from a mixture of three organic solvents and an alkaline solute. The first solvent is chosen to have a dielectric constant equal to or greater than 35 (e.g. propylene carbonate), the second solvent is a linear polyether with its ether functional groups in the $\gamma$ position (e.g. 1,2-dimethoxyethane) and the third solvent has a high solvation power for dissolving large quantities of the alkaline salt (e.g. 1,3-dioxolane). The solvents are chosen that the conductivity maxima of the elctrolytes that would be obtained by mixing the solvents in pairs are higher than the conductivity maxima of the electrolytes that would be obtained by using each of the solvents on its own. Although 1,3-dioxolane has a high solvation power for dissolving large quantities of alkaline salt, in many cell systems it wouldn't provide a suitable conductivity for the electrolyte solution at a molar concentration of the solute of 1 molar per liter or less.

Japanese Patent Application 57-50772 discloses an organic electrolyte for cells which comprises propylene carbonate, dimethoxyethane and dioxolane and wherein the volume of dioxolane in the mixture is kept at between 5% to 10%.

Japanese Patent Application 63-152886 discloses a nonaqueous secondary battery employing an electrolyte which comprises a solvent of 1,3-dioxane or a solvent mixture containing 1,3-dioxane, an anode of lithium or lithium alloy and a cathode of a manganese dioxide-base material. The 1,3-dioxane solvent is stated as forming a protective film on the anode through reduction of the solvent which suppresses the formation of lithium dendrite growth that usually occurs during the discharge-charge cycling of the battery.

One object of the present invention is to provide an electrolyte solution suitable for electrochemical cells that will effectively prevent internal shorting of such cells when subjected to certain kinds of abusive conditions.

Another object of the present invention is to provide an electrolyte solution admirably suitable for cells employing internal circuit interrupter mechanisms.

Another object of the present invention is to provide an electrolyte solution admirably suitable for lithium cells, particularly lithium cells employing a coiled rolled electrode assembly.

Another object of the present invention is to provide an electrolyte solution ideally suited for cells employing a lithium anode and an iron sulfide-containing cathode.

The foregoing and additional objects will become more fully apparent from the following description.

SUMMARY OF THE INVENTION

The invention relates to an organic electrolyte for use in an electrochemical cell comprising a solute dissolved in a mixture of 32 to 45 volume precent of a linear alipthatic ether; 40 to 53 volume percent of a polymerizable component of a cyclic ether; and 8 to 18 volume percent of an alkylene carbonate.

Preferable linear aliphatic ehters are 1,2-and 1,1-dimethoxyethane, dimethylether of diethylene glycol, dimethylether of triethylene glycol, dibutylether of diethylene glycol, diethylether, and diisopropyl ether. The preferable polymerizable component of a cyclic ether is 1,3-dioxolane. Preferable alkylene carbonates are propylene carbonate, ethylene carbonate and butylene carbonate.

It has been observed that although an alkylene carbonate such as propylene carbonate has a high dielectric constant, if too much of it is used in the electrolyte solution of a lithium cell and the cell is subjected to forced charging, then the high content of the propylene carbonate promotes lithium dendrite formation. This lithium dendrite formation could result in internal cell shorting causing electolyte leakage or cell disassemblyl. In cells employing internal circuit interrupter mechanisms or cells employing coiled electrode assemblies, this lithium dendrite formation could present safety problems. In addition, propylene carbonate is known to react with lithium to form lithium carbonate deposits. Such deposits on a lithium electrode could lead to nonuniform current distribution on charging and could result in areas of high current density where lithium dendrites can be formed and internal shorting can occur. Thus to prevent formation of lithium dendrites, the amount of propylene carbonate in the electrolyte solution should be kept to 18 volume percent or lower. However, an amount of propylene carbonate of 8 or greater volume percent should be present because of its high dielectric constant which is 64. Preferably, the amount of propylene carbonate in the electrolyte solution should be from 9 to 15 volume percent, most preferably about 10 volume percent.

It is believed that with a rather high concentration of dioxolane in the electrolyte solution, polymerization will occur through oxidation of the dioxolane that will effectively form a film at the interface of the shape memory metal alloy switch and the inner cell cover, and on the lithium, particularly on the areas of high current density. Thus the amount of dioxolane present in the electrolyte solution should be from about 40 to about 53 volume percent, preferably 45 to 50 volume percent and most preferably about 50 volume percent.

The remaining solvent in the electrolyte solution should be a linear aliphatic ether such as 1,2-dimethoxyethane. The solvent functions as a relatively nonreactive (with lithium) low viscosity solvent.

In addition to the safety features obtained from the use of an electrolyte solution containing a low concentration of propylene carbonate and a rather large concentration of dioxolane, it was unexpectedly observed that these novel proportions of these solvents produced an excellent low temperature electrolyte solution. Unexpectedly, the electrolyte solution of the subject invention with the rather low amount of propylene carbonate and high amount of dioxolane performed better at $-20°$ C. with a 1M $LiCF_3SO_3$ solute, than electrolyte solutions containing a much higher amount of propylene carbonate (see Example 2 below).

Highly active metal anodes suitable for this invention include lithium (Li), sodium (Na), potassium (K), calcium (Ca), magnesium (Mg) and their alloys. Of these active metals, lithium would be preferred because in addition to being a ductile, soft metal that can easily be assembled in a cell, it possesses the highest energy-to-weight ratio of the group of suitable anode metals.

Cathodes for use in this invention are solid electrodes which include fluorinated carbon represented by the formula $(CF_x)_n$ wherein x varies between about 0.5 and about 1.2 and $(C_2F)_n$ wherein in both cathodes the n refers to the number of monomer units which can vary widely, copper sulfide (CuS), copper oxide (CuO), lead dioxide ($PbO_2$), iron sulfides (FeS, $FeS_2$), copper chloride ($CuCl_2$), silver chloride (AgCl), sulfur (S), bismuth thrioxide ($Bi_2O_3$), copper bismuth oxide ($CuBi_2O_4$), and the like. The $(CF_x)_n$ electrodes are composed of carbon and fluorine, said carbon including graphitic and nongraphitic forms of carbon, such as coke, charcoal or active carbon. As disclosed in U.S. Pat. Nos. 3,536,532 and 3,700,502, solid fluorinated carbon electrodes are extremely stable and resistive to chemical reaction over the range of values of x from greater than 0 to about 1. Preferably, $(CF_x)_n$ cathodes wherein x varies between about 0.8 and about 1.1 would be admirably suited for use with the specific electrolyte of the invention because this range represents the best available energy density of these cathode materials. The preferred cathodes for use in this invention are the iron sulfides alone and in combination with other cathode materials such as:

$FeS_2+CuO$
$FeS_2+Bi_2O_3$
$FeS_2+Pb_2Bi_2O_5$
$FeS_2+Pb_3O_4$
$FeS_2+CuO+Bi_2O_3$
$FeS_2+CuO+Pb_3O_4$
$FeS_2+CuO+CoS_2$
$FeS_2+CuBi_2O_4$
$FeS_2+MnO_2$
$FeS_2+CoS_2$

The ionizable solute for use in this invention may be a simple salt ($LiCF_3SO_3$) or double salt or mixtures thereof which will produce an ionically conductive solution when dissolved in these solvents. Suitable solutes are complexes of inorganic or organic Lewis acids and inorganic ionizable salts. One of the requirements for utility is that the salts, whether simple or complex, be compatible with the solvent(s) being employed and that they yield a solution which is sufficiently ionically conductive, e.g., at least about $10^{-4} ohm^{-1} cm^{-1}$. Generally, an amount of at least about 0.5 M (moles/liter) would be sufficient for most cell applications.

Typical suitable Lewis acids include aluminum fluoride, aluminum bromide, aluminum chloride, anitmony pentachloride, zirconium tetrachloride, phosphorus pentachloride, phosphorus pentafluoride, boron fluoride, boron chloride, boron bromide, and arsenic pentafluoride.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. The ionizable solute for use in conjunction with iron sulfide-containing cathode would be lithium trifluoromethanesulfonate ($LiCF_3SO_3$), lithium perchlorate ($LiClO_4$), lithium hexafluoroarsenate ($LiAsF_6$) or mixtures thereof. Suitable double salts for various cell applications would be lithium tetrafluoroborate ($LiBF_4$), lithium hexafluorophosphate ($LiPF_6$) and potassium hexafluoroarsenate ($KAsF_6$).

EXAMPLE 1

Several cells were produced each containing an anode of 1 gram of lithium, a cathode of 4.8 grams of a mix containing 91% $FeS_2$, 2.25% binder, 4.75% conductive agent (acetylene black and graphite) and 2% metallic zinc, and 2 grams of an electrolyte as shown in Table 1. Each cell contained a current collector-safety switch of a shape memory alloy member, in this instance of a nickel-titanium alloy, which functioned such that upon a temperature rise in the cell above about 85° C., portions of the alloy member retracted and broke electrical contact with the current collector thereby providing an internal open circuit for the cell. Each cell was force-charged whereupon the temperature of the cell increased and the cell was inspected to see if the memory alloy disconnected and opened the internal circuit of the cell. In some of the cells, the internal circuit alternated between the open and closed position producing an intermittent internal circuit condition referred to as chatter. This chatter effect is undesirable in most applications. The cells were removed from the forced charge and examined to see if the internal circuit remained open or if it had returned to the closed state. The data observed from these tests are shown in Table 1. The data show that the cells of this invention (Samples C and D) had less incidence of chatter than the cells employing propylene carbonate in amounts larger that 18% volume percent.

TABLE 1

| Sample | No. of Cells | Electrolyte | Cell Case Temp. | Chatter No. of Cells | Reconnected No. of Cells |
|---|---|---|---|---|---|
| A | 7 | #1 | 38° C.–60° C. | 5 | 0 |
| B | 9 | #2 | 31° C.–85° C. | 5 | 2 |
| C | 8 | #3 | 26° C.–86° C. | 2 | 0 |
| D | 16 | #4 | 32° C.–87° C. | 1 | 0 |

1 electrolyte - 65 vol. % PC; 35 vol. % DME containing 1M $LiCF_3SO_3$
2 electrolyte - 65 vol. % PC; 35 vol. % DIOX containing 1M $LiCF_3SO_3$
3 electrolyte - 50 vol. % DIOX; 40 vol. % DME; 10 vol. % PC containing 1M $LiClO_4$
4 electrolyte - 50 vol. % DIOX; 40 vol. % DME; 10 vol. % PC containing 1M $LiCf_3SO_3$

EXAMPLE 2

Sample cells were produced as in Example 1 with the same components except for the electrolyte solution which is shown in Table 2. The cells were each discharged across a 3.9 ohm load until a 0.8 volt level was reached. The testing of the cells was conducted at 21° C. and −20° C. The data observed, including the open circuit voltage (OCV), are shown in Table 2. From the data shown in Table 2, the cells of this invention (Sample cells E and F) provide a longer service life at −20° C. than cells of the prior art (Sample cells G and H).

TABLE 2

| | | | 21° C. Average of 2 cells | | −20° C. Average of 2 cells | |
|---|---|---|---|---|---|---|
| Sample | No. of Cells | Electrolyte | OCV (Volt) | Minutes to 0.8 V | OCV (Volt) | Minutes to 0.8 V |
| E | 2 | #4* | 1.765 | 525 | 1.75 | 357 |
| F | 2 | #4* | 1.765 | 514 | 1.64 | 355*** |
| G | 2 | ** | 1.8 | 544 | 1.66 | 292 |
| H | 2 | #1* | 1.8 | 535 | 1.65 | 299 |

*same as electrolyte number in Example 1
**Electrolyte - 50 vol. % PC; 50 vol. % DME and 1M $LiCF_3SO_3$
***only one cell While the present invention has been described with reference to many particular details thereof, it is not intended that these details shall be construed as limiting the scope of this invention.

What is claimed:

1. An organic electrolyte solution for use in an electrochemical cell comprising a solute dissolved in a mixture of 32 to 45 volume percent of a linear aliphatic ether; 40 to 53 volume percent of a polymerizable component of a cyclic ether; and 8 to 18 volume percent of an alkylene carbonate.

2. The organic electrolyte solution of claim 1 wherein the alkylene carbonate comprises at least one solvent selected from the group consisting of propylene carbonate, ethylene carbonate, and butylene carbonate.

3. The organic electrolyte solution of claim 1 wherein the linear aliphatic ether comprises at least one solvent selected from the group consisting of dimethoxyethane, dimethylether of diethylene glycol, dimethylether of triethylene glycol, dibutylether of diethylene glycol, diethylether, and diisopropyl ether.

4. The organic electrolyte solution of claim 2 wherein the alkylene carbonate is propylene carbonate.

5. The organic electrolyte solution of claim 1 wherein the polymerizable component of a cyclic ether is dioxolane.

6. The organic electrolyte solution of claim 3 wherein the linear aliphatic ether is dimethoxyethane.

7. The organic electrolyte solution of claim 1 wherein the alkylene carbonate is propylene carbonate; the polymerizable component of a cyclic ether is dioxolane; and the linear aliphatic ether is dimethoxyethane.

8. The organic electrolyte solution of claim 7 wherein the propylene carbonate is present in an amount of 9 to 15 volume percent; the dioxolane is present in an amount of 45 to 50 volume percent; and the dimethoxyethane is present in an amount of 35 to 40 volume percent.

9. The organic electrolyte solution of claim 8 wherein the amount of propylene carbonate is about 10 volume percent; the amount of dioxolane is about 50 volume percent; and the amount of dimethoxyethane is about 40 volume percent.

10. The organic electrolyte solution of claim 1 wherein the solute is selected from the group consisting of lithium trifluoromethanesulfonate ($LiCF_3SO_3$); lithium perchlorate ($LiClO_4$), lithium hexafluoroarsenate ($LiAsF_6$), lithiun hexafluorophosphate ($LiPF_6$), and mixtures thereof.

11. The organic electrolyte solution of claim 1 in a cell with a cathode and anode, and wherein the cathode is selected from the group consisting of fluorinated carbon, a metal sulfide, a metal oxide, a metal chloride and mixtures thereof.

12. The organic electrolyte solution of claim 1 in a cell with an anode and a cathode, and wherein the anode is selected from the group consisting of lithium, sodium, potassium, calcium, magnesium and their alloys.

13. The organic electrolyte solution of claim 8 in a cell with a cathode of iron sulfide and an anode of lithium.

14. The organic electrolyte solution of claim 13 wherein said solute is lithium trifluoromethanesulfonate ($LiCF_3SO_3$).

15. The organic electrolyte solution of claim 14 wherein the amount of propylene carbonate is 10 volume percent; the amount of dioxolane is 50 volume percent; and the amount of dimethoxyethane is 40 volume percent.

16. The organic electrolyte solution of claim 1 in a cell employing a coiled rolled electrode assembly comprising an anode electrode and a cathode electrode.

17. The organic electrolyte solution of claim 13 in a cell in which the lithium anode cathode and iron sulfide cathode are rolled into a coiled rolled assembly.

* * * * *